United States Patent
Li et al.

(10) Patent No.: US 12,147,107 B2
(45) Date of Patent: Nov. 19, 2024

(54) SPLICING DISPLAY PANEL AND PREPARATION METHOD THEREOF

(71) Applicant: TCL CHINA STAR OPTOELECTRONICS TECHNOLOGY CO., LTD., Guangdong (CN)

(72) Inventors: Meinan Li, Guangdong (CN); Yongping Fan, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,416

(22) PCT Filed: Apr. 20, 2022

(86) PCT No.: PCT/CN2022/087943
§ 371 (c)(1),
(2) Date: Apr. 28, 2022

(87) PCT Pub. No.: WO2023/193303
PCT Pub. Date: Oct. 12, 2023

(65) Prior Publication Data
US 2024/0192537 A1     Jun. 13, 2024

(30) Foreign Application Priority Data
Apr. 6, 2022    (CN) .......................... 202210359486.2

(51) Int. Cl.
G02F 1/1333     (2006.01)
G02F 1/1335     (2006.01)

(52) U.S. Cl.
CPC ........ *G02F 1/13336* (2013.01); *G02F 1/1333* (2013.01); *G02F 1/133308* (2013.01); *G02F 1/133514* (2013.01); *G02F 1/133528* (2013.01)

(58) Field of Classification Search
None
See application file for complete search history.

(56) References Cited

U.S. PATENT DOCUMENTS 5,812,226 A  *  9/1998   Izumi .................. G02F 1/13336
                                                    349/73
10,672,306 B1    6/2020   Whidden
(Continued)

FOREIGN PATENT DOCUMENTS

CN         111653207 A     9/2020
CN         211826840 U     10/2020
(Continued)

OTHER PUBLICATIONS

International Search Report in International application No. PCT/CN2022/087943, mailed on Nov. 30, 2022.
(Continued)

*Primary Examiner* — Shan Liu

(57) ABSTRACT

The present application provides a splicing display panel and a preparation method thereof. The splicing display panel comprises a first sub-display panel, a second sub-display panel, and a third sub-display panel. Both the first and second sub-display panels comprise a first substrate, and the first substrate comprises an accommodation groove. One end of the third sub-display panel is accommodated and fixed in the accommodation groove of the first sub-display panel, and another end is accommodated and fixed in the accommodation groove of the second sub-display panel.

(Continued)

Surfaces of the first, second, and third sub-display panels facing away from a color film functional layer are flush.

18 Claims, 3 Drawing Sheets

(56) References Cited

U.S. PATENT DOCUMENTS

| | | | |
|---|---|---|---|
| 2004/0189588 A1* | 9/2004 | Dong | G02B 6/0043 |
| | | | 345/102 |
| 2018/0088399 A1* | 3/2018 | Fukushi | C03B 23/0357 |
| 2024/0045251 A1* | 2/2024 | Chen | G02F 1/133322 |

FOREIGN PATENT DOCUMENTS

| | | | | |
|---|---|---|---|---|
| CN | 212160282 U | | 12/2020 | |
| CN | 113281928 A | | 8/2021 | |
| CN | 113376883 A | * | 9/2021 | ......... G02F 1/13336 |
| CN | 113703211 A | | 11/2021 | |
| CN | 214669956 U | * | 11/2021 | |
| CN | 114038340 A | | 2/2022 | |
| CN | 114241937 A | | 3/2022 | |
| CN | 111653207 B | * | 12/2022 | ....... G02F 1/133528 |
| TW | 200842405 A | | 11/2008 | |

OTHER PUBLICATIONS

Written Opinion of the International Search Authority in International application No. PCT/CN2022/087943, mailed on Nov. 30, 2022.
Chinese Office Action issued in corresponding Chinese Patent Application No. 202210359486.2 dated Apr. 5, 2023, pp. 1-7.

* cited by examiner

SPLICING DISPLAY PANEL AND PREPARATION METHOD THEREOF

TECHNICAL FIELD

The present application relates to a field of splicing display, in particular to a splicing display panel and a preparation method thereof.

BACKGROUND

With development of technologies such as 5G, internet, and big data, people's market demand for high-end large screens is increasing. However, size of a monolithic LCD screen is limited by process equipment and cannot meet people's market demand for large screens, and LCD splicing screens are still a mainstream product in the market. However, it is difficult for the LCD splicing screens to realize zero-seam splicing display due to presence of their frame. For this reason, in the prior art, mini-LED direct display panel is adopted to improve splicing to achieve seamless splicing effect. In view of this, a mini-LED direct display panel is directly attached to a bezel area of an LCD screen and exceeds a surface of the LCD screen in height by more than 1 mm, but there is a visual difference when viewed from a side view, resulting in poor display effects.

Technical Problem

A mini-LED direct display panel is directly attached to a bezel area of an LCD screen and exceeds a surface of the LCD screen in height by more than 1 mm, but there is a visual difference when viewed from a side view, resulting in poor display effects.

Technical Solution

In view of this, the present application provides a backlight structure and a display device capable of improving intensity unevenness of a periodic light source.

In view of this, the present application further provides a splicing display panel capable of achieving seamless splicing without visual differences when viewed from a side and a preparation method thereof.

Technical solutions adopted by the present application to solve the above technical problem are as follows:

In a first aspect, the present application provides a splicing display panel, which comprises a first sub-display panel, a second sub-display panel and a third sub-display panel, and both the first sub-display panel and the second sub-display panel comprise a display area and a non-display area connected with the display area; wherein, both the first sub-display panel and the second sub-display panel comprise a color film substrate, and each of the color film substrates comprises a first substrate and a color film functional layer formed on the first substrate;

an accommodation groove is defined on the first substrate, and the accommodation groove is located at least in the non-display area;

one of the first sub-display panel and one of the second sub-display panel adjacent to each other are disposed in parallel, and the accommodation groove of the first sub-display panel is disposed opposite to the accommodation groove of the second sub-display panel;

one end of the third sub-display panel is accommodated and fixed in the accommodation groove of the first sub-display panel, and another end is accommodated and fixed in the accommodation groove of the second sub-display panel; and surfaces of the first sub-display panel, the second sub-display panel, and the third sub-display panel facing away from the color film functional layer are located on a same plane.

In an optional embodiment of the present application, both the first sub-display panel and the second sub-display panel further comprise:

a polarizer formed on a surface of the first substrate facing away from the color film functional layer;

wherein the polarizer is formed with an opening, an orthographic projection of the opening on the color film functional layer is defined as S1, an orthographic projection of the accommodation groove corresponding to the opening on the color film functional layer is defined as S2, and S1 overlaps with S2.

In an optional embodiment of the present application, the accommodation groove of the first sub-display panel is further located in the display area of the first sub-display panel, and the accommodation groove of the second sub-display panel is further located in the display area of the second sub-display panel; and one end of the third sub-display panel is attached to one side wall of the accommodation groove of the first sub-display panel facing the second sub-display panel, and another end of the third sub-display panel is attached to one side wall of the accommodation groove of the second sub-display panel facing the first sub-display panel.

In an optional embodiment of the present application, both the first sub-display panel and the second sub-display panel further comprise:

an array substrate disposed opposite to one of the color film substrates; the array substrate comprises a second substrate having a thickness less than a thickness of the first substrate;

a plastic frame disposed between the array substrate and the color film substrate and located in the non-display area; and liquid crystals located in a space surrounded by the array substrate, the color film substrate, and the plastic frame.

In an optional embodiment of the present application, surface flatness of surfaces of the first sub-display panel, the second sub-display panel, and the third sub-display panel facing away from the color film functional layer is ±5 μm.

In an optional embodiment of the present application, the first substrate comprises a first surface facing away from the color film functional layer, a second surface facing the color film functional layer, and a first side surface vertically connected with the first surface and the second surface; and the accommodation groove comprises a side wall and a bottom wall vertically connected with the side wall; the side wall is vertically connected with the first surface, and the bottom wall is vertically connected with the first side surface; the accommodation groove and the third sub-display panel meet a requirement of D1 is equal to or less than ½D2, wherein D1 is a width of the bottom wall, the width of the bottom wall refers to a vertical distance from the side wall to the first side surface, D2 is a width of the third sub-display panel, and the width of the third sub-display panel refers to a distance between two ends of the third sub-display panel accommodated in the accommodation groove.

In an optional embodiment of the present application, the first substrate is further formed with at least one first groove, the first groove communicates with the accommodation groove, the first groove has a first connecting member, and the third sub-display panel is connected with the first sub-display panel and the second sub-display panel through the first connecting member.

In an optional embodiment of the present application, an exposed surface of the first connecting member is flush with an inner wall of the accommodation groove; a depth of the accommodation groove of the first sub-display panel is equal to a depth of the accommodation groove of the second sub-display panel, and both are equal to a thickness of the third sub-display panel; or the exposed surface of the first connecting member is higher than the inner wall of the accommodation groove, the depth of the accommodation groove of the first sub-display panel is greater than the thickness of the third sub-display panel, and the depth of the accommodation groove of the second sub-display panel is greater than the thickness of the third sub-display panel.

In an optional embodiment of the present application, the first substrate is further formed with at least one second groove, and the second groove penetrates through the first side surface; the splicing display panel further comprises a second connecting member, one end of the second connecting member is fixed on the third sub-display panel, and another end is accommodated and fixed in the second groove.

In a second aspect, the present application further provides a method for preparing a splicing display panel, which comprises steps as follows:

providing a first sub-display panel and a second sub-display panel, both the first sub-display panel and the second sub-display panel comprise a color film substrate, an array substrate, and liquid crystals disposed between the color film substrate and the array substrate; both the first sub-display panel and the second sub-display panel comprise a display area and a non-display area connected with the display area; and each of the color film substrates comprises a first substrate and a color film functional layer formed on the first substrate;

forming at least an accommodation groove from one end of each of the first substrates, wherein each of the accommodation grooves is located in the non-display area and a part of the display area corresponding to the first substrate; and providing a third sub-display panel and accommodating and fixing both ends of the third sub-display panel in two accommodation grooves of the first sub-display panel and the second sub-display panel;

wherein surfaces of the first sub-display panel, the second sub-display panel, and the third sub-display panel facing away from the color film functional layer are located on a same plane.

TECHNICAL EFFECTS

According to the splicing display panel and preparation method thereof provided by the present application, an accommodation groove is defined respectively on opposite ends of the first substrate of the color film substrate of the first sub-display panel and the second sub-display panel that are adjacent to each other, and both ends of the third sub-display panel are fixed in the two accommodation grooves. By controlling depths of the accommodation grooves, surfaces of the third sub-display panel, the first sub-display panel, and the second sub-display panel that are facing away from the color film functional layer of the color film substrate can be located on a same plane, so that there is no visual difference when viewed from a side view, thereby improving display effect of the splicing display panel.

BRIEF DESCRIPTION OF THE DRAWINGS

In order to more clearly describe the technical solutions in embodiments of the present application, hereinafter, the appended drawings used for describing the embodiments will be briefly introduced. The appended drawings described below are only directed to some embodiments of the present application, and for a person skilled in the art, without expenditure of creative labor, other drawings can be derived on the basis of these appended drawings.

DETAILED DESCRIPTION

Hereinafter, technical solution in embodiments of the present application will be clearly and completely described with reference to the accompanying drawings in embodiments of the present application. Apparently, the described embodiments are part of, but not all of, the embodiments of the present application. All the other embodiments, obtained by a person with ordinary skill in the art on the basis of the embodiments in the present application without expenditure of creative labor, belong to the protection scope of the present application.

In description of the present application, it should be understood that the terms "upper" and "lower" that indicating an orientation or a positional relationship are based on an orientation or a positional relationship shown in the accompanying drawings, which are merely intended to facilitate the description of the present application and simplify the description, and are not intended to indicate or imply that a device or an element must have a specific orientation, be constructed and operated in a specific orientation, and therefore cannot be construed as a limitation of the present application. In addition, the terms "first", "second" are used for descriptive purposes only and cannot be understood as indicating or implying relative importance or implicitly indicating the number of indicated technical features. Thus, the features defined by "first" and "second" may explicitly or implicitly include one or more features. In description of the present application, "a plurality of" means two or more, unless specifically limited otherwise.

In the present application, reference numbers and/or reference letters are repeated in different implementations. Such repetition is for purpose of simplification and clarity, and does not indicate relationships between various implementations and/or settings discussed.

A splicing display panel and a preparation method thereof provided by the present application will be described in detail below with reference to specific embodiments and accompanying drawings.

Figure 1:
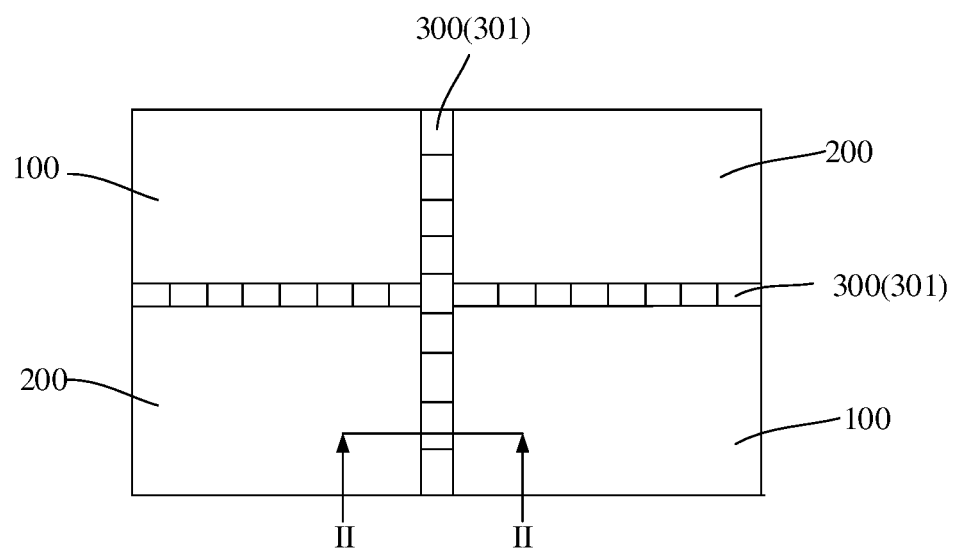
FIG. 1 is a top view of a splicing display panel according to a preferred embodiment of the present application.
Figure 2:
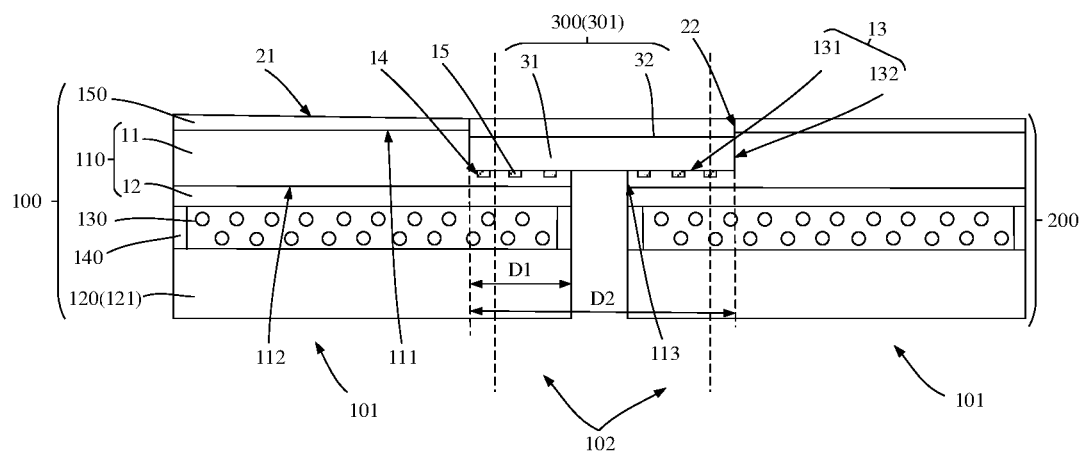
FIG. 2 a cross-sectional view along a section line II-II of the splicing display panel shown in FIG. 1.

Referring to FIGS. 1 and 2, a first embodiment of the present application provides a splicing display panel 1000. The splicing display panel 1000 comprises a first sub-display panel 100, a second sub-display panel 200, and a third sub-display panel 300. Both the first sub-display panel 100 and the second sub-display panel 200 comprise a display area 101 and a non-display area 102 connected with the display area 101. Both the first sub-display panel 100 and the second sub-display panel 200 comprise a color film substrate 110, and each of the color film substrates 110 comprises a first substrate 11 and a color film functional layer 12 formed on the first substrate 11. An accommodation groove 13 is defined on the first substrate 11, and the accommodation groove 13 is located at least in the non-display area 102. One of the first sub-display panel 100 and one of the second sub-display panel 200 adjacent to each other are disposed in parallel, and the accommodation groove 13 of the first sub-display panel 100 is disposed opposite to the accommodation groove 13 of the second sub-display panel 200. One end of the third sub-display panel 300 is accommodated and fixed in the accommodation groove 13 of the first sub-display panel 100, and another end is accommodated and fixed in the accommodation groove 13 of the second sub-display panel 200. Surfaces of the first sub-display panel 100, the second sub-display panel 200, and the third sub-display panel 300 facing away from the color film functional layer 12 are located on a same plane.

Wherein, by controlling depths of the accommodation grooves 13, surfaces of the third sub-display panel 300, the first sub-display panel 100, and the second sub-display panel 200 that are facing away from the color film functional layer 12 of the color film substrate 110 can be located on a same plane, which not only seamless splicing can be realized, but also there is no visual difference present in side views, thereby improving display effects of the splicing display panel 1000.

In an optional embodiment of the present application, the accommodation groove 13 of the first sub-display panel 100 is further located in the display area 101 of the first sub-display panel 100, and the accommodation groove 13 of the second sub-display panel 200 is further located in the display area 101 of the second sub-display panel 200; one end of the third sub-display panel 300 is attached to one side wall of the accommodation groove 13 of the first sub-display panel 100 facing the second sub-display panel 200, and another end of the third sub-display panel 300 is attached to one side wall of the accommodation groove 13 of the second sub-display panel 200 facing the first sub-display panel 100.

Wherein, at least a part of the accommodation groove 13 is defined in the display area 101 of the first sub-display panel 100 or the display area 101 of the second sub-display panel 200, so that one end of the third sub-display panel 300 is attached to one side wall of the accommodation groove 13 of the first sub-display panel 100 facing the second sub-display panel 200, and another end of the third sub-display panel 300 is attached to one side wall of the accommodation groove 13 of the second sub-display panel 200 facing the first sub-display panel 100, which not only seamless splicing can be achieved, but also cutting accuracy of the accommodation groove 13 can be reduced, thus realizing seamless splicing even when cutting accuracy of the accommodation groove 13 is not high.

In an optional embodiment of the present application, surface flatness of surfaces of the first sub-display panel 100, the second sub-display panel 200, and the third sub-display panel 300 facing away from the color film functional layer 12 is ±5 μm.

Specifically, the first substrate 11 comprises a first surface 111 facing away from the color film functional layer 12, a second surface 112 facing the color film functional layer 12, and a first side surface 113 vertically connected with the first surface 111 and the second surface 112. The accommodation groove 13 penetrates the first surface 111 and the first side surface 113. The accommodation groove 13 comprises a bottom wall 131 and a side wall 132 vertically connected with the bottom wall 131; the side wall 132 is vertically connected with the first surface 111, and the bottom wall 131 is vertically connected with the first side surface 113.

In the accommodation groove 13 of the first sub-display panel 100 or the second sub-display panel 200, a vertical distance from the side wall 132 to the first side surface 113 is defined as a width $D_1$ of the bottom wall 131, and a distance between two ends of the third sub-display panel 300 accommodated in the accommodation groove 13 is defined as a width $D_2$ of the third sub-display panel 300. $D_1$ is less than or equal to $\frac{1}{2}D_2$.

In an optional embodiment of the present application, the cutting accuracy of the accommodation groove 13 in a width direction thereof is ±20 μm.

In an optional embodiment of the present application, the first substrate 11 is further formed with at least one first groove 14, and the first groove 14 communicates with the accommodation groove 13; the first groove 14 has a first connecting member 15, and the third sub-display panel 300 is connected with the first sub-display panel 100 and the second sub-display panel 200 through the first connecting member 15.

Referring to FIG. 2, in this embodiment, the first groove 14 is recessed from the bottom wall 131 of the accommodation groove 13 toward an inside of the first substrate 11. In other embodiments, the first groove 14 may also be recessed from the side wall 132 of the accommodation groove 13 toward an inside of the first substrate 11.

Referring to FIG. 2, in this embodiment, a number of the first grooves 14 is multiple. Of course, in other embodiments, the number of the first grooves 14 may also be one.

Referring to FIG. 2, in an optional embodiment of the present application, an exposed surface of the first connecting member 15 is flush with an inner wall of the accommodation groove 13; a depth of the accommodation groove 13 of the first sub-display panel 100 is equal to a depth of the accommodation groove 13 of the second sub-display panel 200, and both are equal to a thickness of the third sub-display panel 300.

The first connecting member 15 can be a viscose or a magnetic component, and when the first connecting member 15 is a magnetic component, the third sub-display panel 300 is further disposed with a magnetic component matching the first connecting member 15.

Specifically, the color film substrate 110 comprises the first substrate 11 and the color film functional layer 12. The color film functional layer 12 comprises a black matrix (not shown) and a color resist layer (not shown), wherein the black matrix is formed on the first substrate 11, and a plurality of color resist defining openings are formed on the black matrix. The color resist layer comprises at least a plurality of first color resists, a plurality of second color resists, and a plurality of third color resists, and one of the first color resists, the second color resists, and the third color resists is disposed in one of the color resist defining openings. Specifically, the first color resist, the second color resist, and the third color resist are sequentially a red color resist, a green color resist, and a blue color resist. Certainly, the color resist layer may also comprise a white color resist.

In an optional embodiment of the present application, the first substrate 11 is a transparent glass. In other embodiments, the first substrate 11 may also be a substrate made of other materials, and is not limited to the transparent glass.

In an optional embodiment of the present application, a thickness of the first substrate ranges from 0.4 mm to 1 mm. Preferably, the thickness of the first substrate 11 is 1 mm.

In an optional embodiment of the present application, the first sub-display panel 100 and the second sub-display panel 200 further comprise a polarizer 150, and the polarizer 150 is formed on a surface of the first substrate 11 facing away from the color film functional layer 12.

Figure 3:
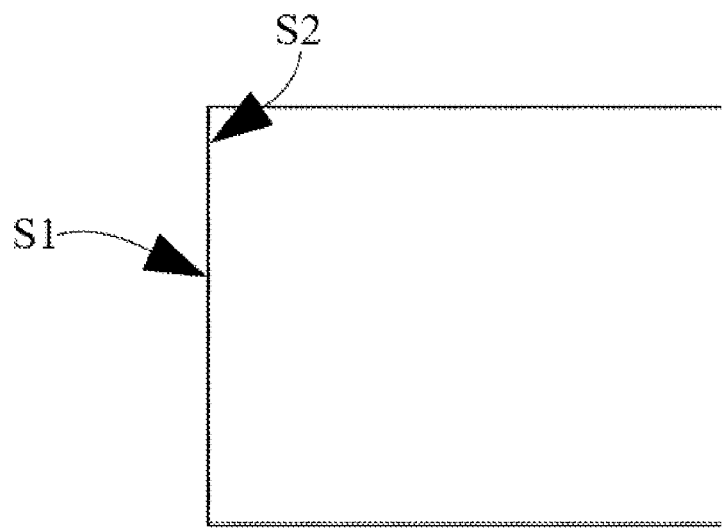
FIG. 3 is schematic diagram of orthographic projections of an opening and an accommodation groove corresponding thereto on a color film functional layer in the splicing display panel shown in FIG. 2.

Specifically, referring to FIGS. 2 and 3, the polarizer 150 is formed with an opening 22; an orthographic projection of the opening 22 on the color film functional layer 12 is defined as S1, an orthographic projection of the accommodation groove 13 corresponding to the opening 22 on the color film functional layer is defined as S2, and S1 overlaps with S2.

In an optional embodiment of the present application, the polarizer 150 further comprises a third surface 21 facing away from the first substrate 11, the third surface 21 is parallel to the first surface 111, and the opening 22 penetrates through the polarizer 150 from the third surface 21. The third surfaces 21 of the polarizer 150 of the first sub-display panel 100 and the polarizer 150 of the second sub-display panel 200 are flush with a surface of the third sub-display panel 300 facing away from the color film functional layer 12.

In an optional embodiment of the present application, surface flatness of surfaces of the polarizer 150 of the first sub-display panel 100, the polarizer 150 of the second sub-display panel 200, and the third sub-display panel 300 facing away from the color film functional layer 12 is ±5 μm.

In an optional embodiment of the present application, both the first sub-display panel 100 and the second sub-display panel 200 are liquid crystal display panels. Specifically, both the first sub-display panel 100 and the second sub-display panel 200 further comprise an array substrate 120, liquid crystals 130, and a plastic frame 140, respectively. Wherein, the array substrate 120 is disposed opposite to one of the color film substrates 110; the plastic frame 140 is disposed between the array substrate 120 and the color film substrate 110 and is located in the non-display area 102; and the liquid crystals 130 are located in a space surrounded by the array substrate 120, the color film substrate 110, and the plastic frame 140. The array substrate 120 comprises a second substrate 121, a driving array layer (not shown) formed on the second substrate 121, a planarization layer (not shown) formed on the driving array layer, etc. A thickness of the second substrate 121 is less than the thickness of the first substrate 11.

The thickness of the first substrate 11 of the color film substrate 110 can be increased, so that a thickness of the color film substrate 110 is greater than that of the second substrate 121 of the array substrate 120, thereby facilitating cutting the accommodation groove 13 with a definite depth on the first substrate 11.

Referring again to FIGS. 1 and 2, in this embodiment, the third sub-display panel 300 is a light-emitting diode panel, and the third sub-display panel 300 comprises a plurality of light-emitting diodes 301; the plurality of light-emitting diodes 301 are disposed in parallel and connected to form a light-emitting diode strip, and the light-emitting diode strips are respectively disposed between two adjacent first sub-display panel 100 and the second sub-display panel 200. Specifically, opposite ends of each of the light-emitting diodes 301 are respectively fixed in the accommodation grooves 13 of the first sub-display panel 100 and the second sub-display panel 200. Different light-emitting diode strips intersect at one point.

In this embodiment, the splicing display panel 1000 comprises two first sub-display panels 100, two second sub-display panels 200, and four third sub-display panels 300. The four third sub-display panels 300 comprise four light-emitting diode strips, and the four light-emitting diode strips intersect at one point, that is, the four light-emitting diode strips are disposed in a cross shape. Certainly, in other embodiments, numbers of the first sub-display panel 100, the second sub-display panel 200, and the third sub-display panel 300 comprised in the splicing display panel 1000 are not limited to two, two, and four, respectively, and may be determined according to actual conditions.

The light-emitting diode 301 comprises a driving substrate 31 and an encapsulation layer 32 formed on the driving substrate 31, and a part of the driving substrate 31 faces the bottom wall 131 of the accommodation groove 13. The driving substrate 31 comprises a driving circuit board (not shown) and light-emitting diode grains (not shown), and the encapsulation layer 32 is formed on the driving circuit board and covers the light-emitting diode grains.

Figure 4:
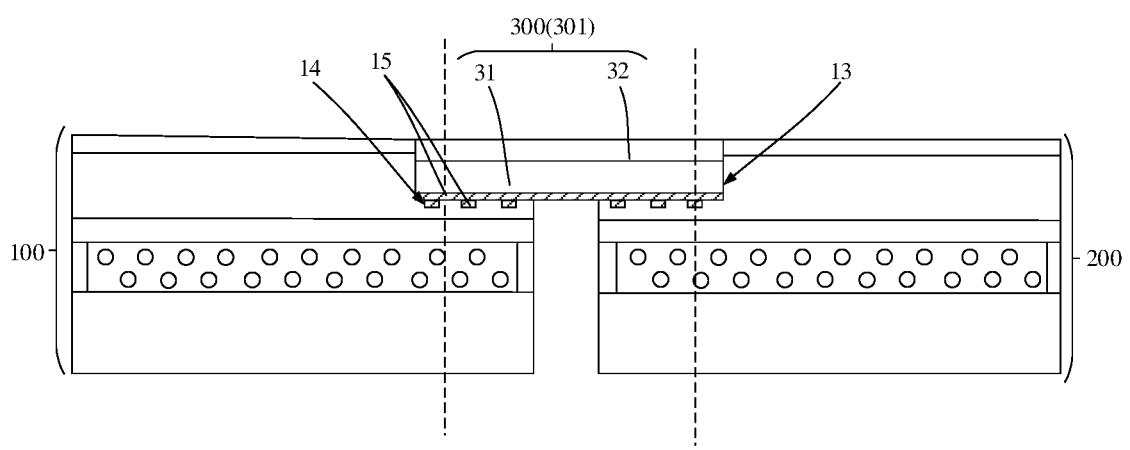
FIG. 4 is a cross-sectional view of a splicing display panel according to a second embodiment of the present application.

Referring to FIG. 4, a second embodiment of the present application provides a splicing display panel 2000. A structure of the splicing display panel 2000 is similar to a structure of the splicing display panel 1000. Differences lie only in that: an exposed surface of the first connecting member 15 is higher than an inner wall of the accommodation groove 13, a depth of the accommodation groove 13 of the first sub-display panel 100 is greater than a thickness of the third sub-display panel 300, and a depth of the accommodation groove 13 of the second sub-display panel 200 is greater than the thickness of the third sub-display panel 300.

In this embodiment, a part of the first connecting member 15 is formed on the bottom wall 131, and another part is located in the first groove 14. Certainly, in other embodiments, the first groove 14 may not be defined on the bottom wall 131 of the accommodation groove 13 of the splicing display panel 2000, and the first connecting member 15 may be directly formed on the bottom wall 131.

Figure 5:
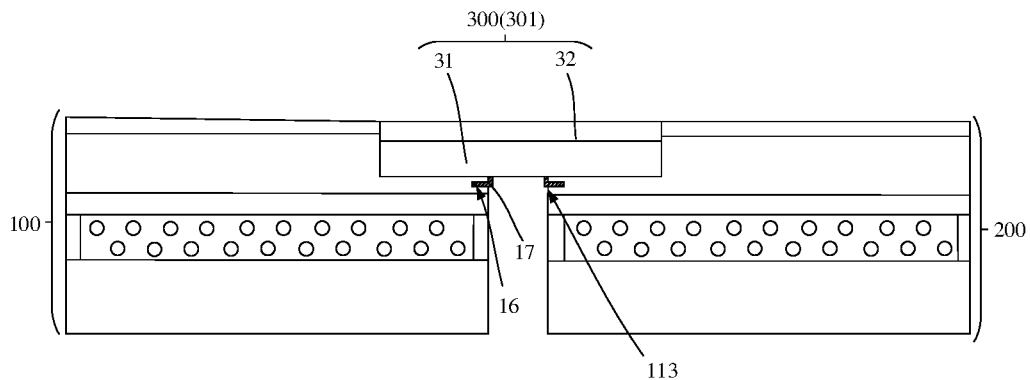
FIG. 5 is a cross-sectional view of a splicing display panel according to a third embodiment of the present application.
Figure 6:
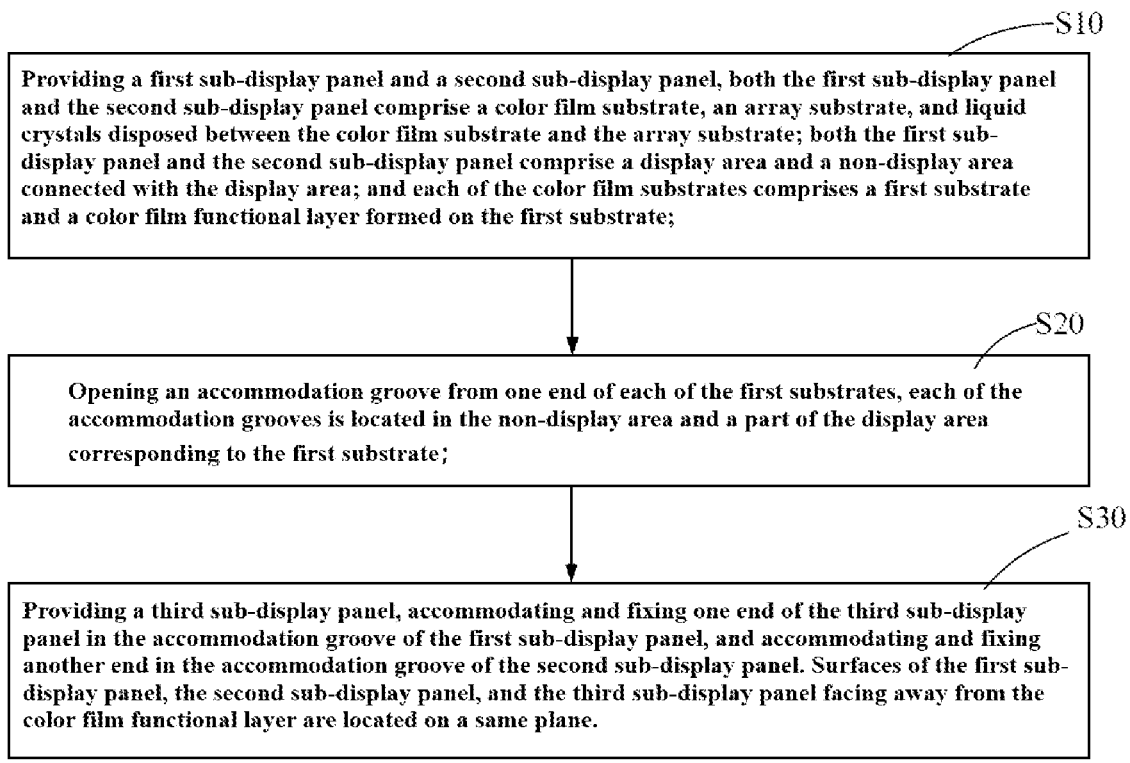
FIG. 6 is a flowchart of a method for preparing a splicing display panel according to a preferred embodiment of the present application.

Referring to FIG. 5, a third embodiment of the present application provides a splicing display panel 3000. A structure of the splicing display panel 3000 is similar to the structure of the splicing display panel 1000. Differences lie only in that: there is no first groove defined on the bottom wall 131 of the accommodation groove 13 of the splicing display panel 3000. At least one second groove 16 is formed on the first substrate 11, and the second groove 16 penetrates the first side surface 113. The splicing display panel 3000 further comprises a second connecting member 17, one end of the second connecting member 17 is fixed on the third sub-display panel 300, and another end is accommodated and fixed in the second groove 16. The splicing display panel 3000 is connected to the first sub-display panel 100 and the second sub-display panel 200 through the second groove 16 and the second connecting member 17. In this embodiment, the second connecting member 17 is in an L shape.

Referring to FIGS. 1-6, the present application also provides a method for preparing a splicing display panel 1000/2000/3000 as described above, which comprises steps of:

S10: providing a first sub-display panel 100 and a second sub-display panel 200, both the first sub-display panel 100 and the second sub-display panel 200 comprise a color film substrate 110, an array substrate 120, and liquid crystals 130 disposed between the color film substrate 110 and the array substrate 120. Both the first sub-display panel 100 and the second sub-display panel 200 comprise a display area 101 and a non-display area 102 connected with the display area 101; and each of the color film substrates 110 comprises a first substrate 11 and a color film functional layer 12 formed on the first substrate 11.

S20: opening an accommodation groove 13 on one end of each of the first substrates 11, each of the accommodation grooves 13 is located in the non-display area 102 and a part of the display area 101 corresponding to the first substrate 11.

S30: providing a third sub-display panel 300, accommodating and fixing one end of the third sub-display panel 300 in the accommodation groove 13 of the first sub-display panel 100, and accommodating and fixing another end in the accommodation groove 13 of the second sub-display panel 200. Surfaces of the first sub-display panel 100, the second sub-display panel 200, and the third sub-display panel 300 facing away from the color film functional layer 12 are located on a same plane.

Before step S20, the method further comprises the steps of attaching polarizers 150 on surfaces of the first substrate 11 of the first sub-display panel 100 and the second sub-display panel 200 facing away from the color film functional layer 12; and forming an opening 22 on each of the polarizers 150, wherein one of the openings 22 corresponds to and communicates with one of the accommodation grooves 13. An orthographic projection of the opening 22 on the color film functional layer 12 is S1, an orthographic projection of the accommodation groove 13 on the color film functional layer 12 is S2, and S1 overlaps with S2.

In an optional embodiment of the present application, cutting accuracy of the opening 22 and the accommodation groove 13 in a width direction of the accommodation groove 13 is ±20 μm.

If size of the opening 22 exceeds a cutting accuracy range of the opening 22, the attachment of the third sub-display panel 300 may be affected or light leakage may occur.

According to the splicing display panel and preparation method thereof provided by the present application, an accommodation groove is defined respectively on opposite ends of the first substrates of the color film substrates of the first sub-display panel and the second sub-display panel that are disposed adjacent to each other, and both ends of the third sub-display panel are fixed in the two accommodation grooves. By controlling depths of the accommodation grooves, surfaces of the third sub-display panel, the first sub-display panel, and the second sub-display panel that are facing away from the color film functional layer of the color film substrate can be located on a same plane, so that there is no visual difference when viewed from a side view, thereby improving display effects of the splicing display panel.

Furthermore, the splicing display panel and preparation method thereof provided by the present application enable the accommodation groove to be further located in the display area of the first sub-display panel; one end of the third sub-display panel to be attached to one side wall of the accommodation groove of the first sub-display panel facing the second sub-display panel, and another end of the third sub-display panel to be attached to one side wall of the accommodation groove of the second sub-display panel facing the first sub-display panel, so that seamless splicing can be achieved, and cutting accuracy of the accommodation groove can be reduced, thus achieving seamless splicing when the cutting accuracy is not high.

Furthermore, the splicing display panel and preparation method thereof provided by the present application can increase a thickness of the first substrate of the color film substrate, so that a thickness of the color film substrate is greater than a thickness of the second substrate of the array substrate, thereby facilitating cutting a accommodation groove with a definite depth on the first substrate.

The splicing display panel provided in embodiments of the present application is described in detail above. The principles and embodiments of the present application are described by using specific examples herein. Descriptions of the above embodiments are merely intended to help understand the technical solutions and core ideas of the present application. A person skilled in the art shall understand that it is still possible to modify the technical solutions described in the above embodiments, or equivalently substitute some of the technical features thereof. However, these modifications or substitutions do not make the essence of the corresponding technical solutions depart from scopes of the technical solutions of each embodiment of the present application.

What is claimed is:

1. A splicing display panel, comprising a first sub-display panel, a second sub-display panel, and a third sub-display panel, and both the first sub-display panel and the second sub-display panel comprise a display area and a non-display area connected with the display area; wherein, both the first sub-display panel and the second sub-display panel comprise a color film substrate, and each of the color film substrates comprises a first substrate and a color film functional layer formed on the first substrate; an accommodation groove is defined on the first substrate, and the accommodation groove is at least located in the non-display area;

one of the first sub-display panel and one of the second sub-display panel adjacent to each other are disposed in parallel, and the accommodation groove of the first sub-display panel is defined opposite to the accommodation groove of the second sub-display panel;

one end of the third sub-display panel is accommodated and fixed in the accommodation groove of the first sub-display panel, and another end is accommodated and fixed in the accommodation groove of the second sub-display panel; and surfaces of the first sub-display panel, the second sub-display panel, and the third sub-display panel facing away from the color film functional layer are located on a same plane;

wherein the first substrate comprises a first surface facing away from the color film functional layer, a second surface facing the color film functional layer, and a first side surface vertically connected with the first surface and the second surface; and wherein the first substrate is further formed with at least one second groove, and the second groove penetrates the first side surface; the splicing display panel further comprises a second connecting member, one end of the second connecting member is fixed on the third sub-display panel, and another end is accommodated and fixed in the second groove.

2. The splicing display panel according to claim 1, wherein both the first sub-display panel and the second sub-display panel further comprise:
a polarizer formed on a surface of the first substrate facing away from the color film functional layer;
wherein the polarizer is formed with an opening; an orthographic projection of the opening on the color film functional layer is defined as S1, an orthographic projection of the accommodation groove corresponding to the opening on the color film functional layer is defined as S2, and S1 overlaps with S2.

3. The splicing display panel according to claim 1, wherein the accommodation groove of the first sub-display panel is further located in the display area of the first sub-display panel, and the accommodation groove of the second sub-display panel is further located in the display area of the second sub-display panel; and
wherein one end of the third sub-display panel is attached to one side wall of the accommodation groove of the first sub-display panel facing the second sub-display panel, and another end of the third sub-display panel is attached to one side wall of the accommodation groove of the second sub-display panel facing the first sub-display panel.

4. The splicing display panel according to claim 1, wherein both the first sub-display panel and the second sub-display panel further comprise:
an array substrate disposed opposite to one of the color film substrates; the array substrate comprises a second substrate, and a thickness of the second substrate is less than a thickness of the first substrate;
a plastic frame disposed between the array substrate and the color film substrate and located in the non-display area; and
liquid crystals located in a space surrounded by the array substrate, the color film substrate, and the plastic frame.

5. The splicing display panel according to claim 1, wherein surface flatness of the surfaces of the first sub-display panel, the second sub-display panel, and the third sub-display panel facing away from the color film functional layer is ±5 μm.

6. The splicing display panel according to claim 1, wherein
the accommodation groove comprises a side wall and a bottom wall vertically connected with the side wall; the side wall is vertically connected with the first surface, and the bottom wall is vertically connected with the first side surface; the accommodation groove and the third sub-display panel meet a requirement of D1 equal to or less than half of D2, wherein D1 is a width of the bottom wall, and the width of the bottom wall refers to a vertical distance from the side wall to the first side surface; D2 is a width of the third sub-display panel, and the width of the third sub-display panel refers to a distance between two ends of the third sub-display panel accommodated in the accommodation groove.

7. The splicing display panel according to claim 1, wherein the first substrate is further formed with at least one first groove; the first groove communicates with the accommodation groove, the first groove has a first connecting member, and the third sub-display panel is connected with the first sub-display panel and the second sub-display panel through the first connecting member.

8. The splicing display panel according to claim 7, wherein an exposed surface of the first connecting member is flush with an inner wall of the accommodation groove; a depth of the accommodation groove of the first sub-display panel is equal to a depth of the accommodation groove of the second sub-display panel, and both are equal to a thickness of the third sub-display panel.

9. The splicing display panel according to claim 7, wherein an exposed surface of the first connecting member is higher than an inner wall of the accommodation groove, a depth of the accommodation groove of the first sub-display panel is greater than a thickness of the third sub-display panel, and a depth of the accommodation groove of the second sub-display panel is greater than the thickness of the third sub-display panel.

10. A method for preparing a splicing display panel, comprising steps of:
providing a first sub-display panel and a second sub-display panel, both the first sub-display panel and the second sub-display panel comprise a color film substrate, an array substrate, and liquid crystals disposed between the color film substrate and the array substrate; both the first sub-display panel and the second sub-display panel comprise a display area and a non-display area connected with the display area; and each of the color film substrates comprises a first substrate and a color film functional layer formed on the first substrate;
opening an accommodation groove on one end of each of the first substrates, each of the accommodation grooves is located in the non-display area and a part of the display area corresponding to the first substrate; and
providing a third sub-display panel and accommodating and fixing two ends of the third sub-display panel in two accommodation grooves disposed oppositely of the first sub-display panel and the second sub-display panel;
wherein surfaces of the first sub-display panel, the second sub-display panel, and the third sub-display panel facing away from the color film functional layer are located on a same plane;
wherein the first substrate comprises a first surface facing away from the color film functional layer, a second surface facing the color film functional layer, and a first side surface vertically connected with the first surface and the second surface; and
wherein the first substrate is further formed with at least one second groove, and the second groove penetrates the first side surface; the splicing display panel further comprises a second connecting member, one end of the second connecting member is fixed on the third sub-display panel, and another end is accommodated and fixed in the second groove.

11. The method for preparing the splicing display panel according to claim 10, wherein both the first sub-display panel and the second sub-display panel further comprise:
a polarizer formed on a surface of the first substrate facing away from the color film functional layer;
wherein the polarizer is formed with an opening; an orthographic projection of the opening on the color film functional layer is defined as S1, an orthographic projection of the accommodation groove corresponding to the opening on the color film functional layer is defined as S2, and S1 overlaps with S2.

12. The method for preparing the splicing display panel according to claim 10, wherein the accommodation groove of the first sub-display panel is further located in the display area of the first sub-display panel, and the accommodation groove of the second sub-display panel is further located in the display area of the second sub-display panel; and wherein one end of the third sub-display panel is attached to one side wall of the accommodation groove of the first sub-display panel facing the second sub-display panel, and another end of the third sub-display panel is attached to one side wall of the accommodation groove of the second sub-display panel facing the first sub-display panel.

13. The method for preparing the splicing display panel according to claim 10, wherein both the first sub-display panel and the second sub-display panel further comprise:
the array substrate disposed opposite to one of the color film substrates; the array substrate comprises a second substrate, and a thickness of the second substrate is less than a thickness of the first substrate;
a plastic frame disposed between the array substrate and the color film substrate and located in the non-display area; and
the liquid crystals located in a space surrounded by the array substrate, the color film substrate, and the plastic frame.

14. The method for preparing the splicing display panel according to claim 10, wherein surface flatness of the surfaces of the first sub-display panel, the second sub-display panel, and the third sub-display panel facing away from the color film functional layer is ±5 μm.

15. The method for preparing the splicing display panel according to claim 10, wherein
the accommodation groove comprises a side wall and a bottom wall vertically connected with the side wall; the side wall is vertically connected with the first surface, and the bottom wall is vertically connected with the first side surface; the accommodation groove and the third sub-display panel meet a requirement of D1 equal to or less than half of D2, wherein D1 is a width of the bottom wall, and the width of the bottom wall refers to a vertical distance from the side wall to the first side surface; D2 is a width of the third sub-display panel, and the width of the third sub-display panel refers to a distance between two ends of the third sub-display panel accommodated in the accommodation groove.

16. The method for preparing the splicing display panel according to claim 10, wherein the first substrate is further formed with at least one first groove; the first groove communicates with the accommodation groove, the first groove has a first connecting member, and the third sub-display panel is connected with the first sub-display panel and the second sub-display panel through the first connecting member.

17. The method for preparing the splicing display panel according to claim 16, wherein an exposed surface of the first connecting member is flush with an inner wall of the accommodation groove; a depth of the accommodation groove of the first sub-display panel is equal to a depth of the accommodation groove of the second sub-display panel, and both are equal to a thickness of the third sub-display panel.

18. The method for preparing the splicing display panel according to claim 16, wherein an exposed surface of the first connecting member is higher than an inner wall of the accommodation groove, a depth of the accommodation groove of the first sub-display panel is greater than a thickness of the third sub-display panel, and a depth of the accommodation groove of the second sub-display panel is greater than the thickness of the third sub-display panel.

\* \* \* \* \*